United States Patent [19]

Gage

[11] Patent Number: 5,390,777
[45] Date of Patent: Feb. 21, 1995

[54] CONSTANT PIVOT MECHANISM FOR VARIABLE HEIGHT RADIAL STACKING CONVEYORS

[75] Inventor: Paul G. Gage, Aurora, Iowa

[73] Assignee: ABCO Engineering Corp., Oelwein, Iowa

[21] Appl. No.: 194,740

[22] Filed: Feb. 14, 1994

[51] Int. Cl.6 ............................................. B65G 41/00
[52] U.S. Cl. .................................. 198/306; 198/317; 198/318
[58] Field of Search ................ 198/306, 312, 315–318, 198/320, 589, 508; 414/133

[56] References Cited

U.S. PATENT DOCUMENTS

| | | | |
|---|---|---|---|
| 1,719,919 | 7/1929 | Barber | 198/306 |
| 2,022,146 | 11/1935 | Ossing | 198/315 |
| 2,709,514 | 5/1955 | Miller | 198/315 |
| 4,135,614 | 1/1979 | Penterman et al. | 198/306 |

OTHER PUBLICATIONS

ABCO Engineering Corp. Catalog pp. 606-1 and 606-2.
ABCO Engineering Corp. Catalog pp. 606-5 and 606-6.
ABCO Engineering Corp. Catalog pp. 606-11.
ABCO Engineering Corp. Catalog pp. 606-33 and 606-34.
ABCO Engineering Corp. Catalog pp. 610-3 and 610-4.
ABCO Engineering Corp. Catalog pp. 610-5 and 610-6.

*Primary Examiner*—Joseph E. Valenza
*Attorney, Agent, or Firm*—James C. Nemmers

[57] ABSTRACT

Radial stacking or stockpiling conveyors are utilized to transport material into stockpiles, storage bins, or other places of storage or placement. The conveyor of the invention has a conveyor frame and an undercarriage that supports the frame and includes a front push arm and a rear push arm and a wheel assembly. The front end of the conveyor frame can be raised and lowered, and the conveyor frame can be swung slowly about the pivot point at the tail end of the conveyor, travelling on the wheel assembly along an arcuate path. To facilitate raising and lowering of the conveyor frame while maintaining a constant pivot radius of travel, a curved cam slot is provided on the conveyor frame through which the top of the rear push arm travels as the conveyor frame is raised and lowered.

4 Claims, 4 Drawing Sheets

CONSTANT PIVOT MECHANISM FOR VARIABLE HEIGHT RADIAL STACKING CONVEYORS

BACKGROUND OF THE INVENTION

This invention relates to a radial stacking (stockpiling) conveyor assembly that is utilized to transport material into stockpiles, storage bins, or other places of storage or placement. Conveyors of this type are generally comprised of a conveyor frame or boom, an undercarriage that may consist of a front push arm and a rear push arm, and a wheel assembly. The front end of the conveyor frame may be raised and lowered mechanically or hydraulically, and the conveyor frame is swung slowly about the pivot point at the tail end of the conveyor, travelling on the wheel assembly along an arcuate path. In order for the conveyor assembly to be swingable about the tail end pivot point while at the same time providing for elevation of the conveyor frame to the proper height for moving the material, it is necessary to have a proper mechanism for the raising and lowering of the conveyor assembly. With conveyors of this type, as the conveyor frame is raised and lowered, a constant radius must be maintained between the rear pivot point of the conveyor frame and the radial traveling arc of the wheel assembly. If some suitable arrangement is not provided to compensate for the raising and lowering of the conveyor, the distance between the end pivot point and the arc of the wheel assembly will vary as the conveyor is raised or lowered, or something in the conveyor structure will fail. In the past, this constant radius has been maintained by the use of a straight cam-lever combination employed at the intersection of the rear push arm and the conveyor frame, or in some models of radial stacking conveyors, a proportional lever-arm and pulley mechanism employing a steel cable subassembly at the intersection of the front push arm and the conveyor frame.

The straight cam-lever combination utilizes a straight channel containing a cam slot that is affixed to the bottom of the conveyor frame, which channel parallels the conveyor frame. A lever arm is pivotally affixed to the bottom of the conveyor frame at one end and to the rear push arm at the other end. As the conveyor frame is raised or lowered, the cam follower located at the top of the rear push arm travels back and forth within this straight cam slot. Thus, as the conveyor frame is raised, the cam follower is slidably drawn forward in the cam slot. Similarly, as the conveyor frame is lowered, the cam follower is slidably pushed rearward in the cam slot. This action operates to allow the undercarriage to pivotly move upwardly and downwardly while the distance between the tail end pivot point of the conveyor and the radial traveling arc of the wheel assembly remains constant. However, as the cam follower travels along the straight cam slot, the linear nature of the cam slot does not geometrically correspond with the movements of the rear push arm and the arc of travel of the pivot points of the lever arm. Rather, the cam follower follows a slightly curved path. As a result, movement of the cam follower through the straight cam slot is met with increased resistance as the cam follower is forced against the side of the channel. This action increases the tension upon the structural components of the triangular configuration of the conveyor frame, rear push arm and front push arm, which increased tension increases the structural stresses transferred to these components. These increased structural stresses can operate to induce fatigue failures over the passage of time and use resulting in higher than normal repair costs being incurred by the owner of the conveyor, and further resulting in losses associated with the down time while repair parts are being made.

Another prior art constant pivot mechanism for maintaining the same arc of wheel travel regardless of the height of the conveyor frame involves the use of a proportional lever-arm pulley mechanism which employs fixed steel cables connected to a pivotal lever arm assembly attached to the conveyor frame. The cables travel over pulleys affixed the top of the front push arm. The connection of the front push arm and the conveyor frame sits within a channel in which the top of the front push arm travels as the conveyor frame is raised and lowered. The lever-arm mechanism rotates as the conveyor frame is raised and lowered so as to maintain the proper tension upon the cables. This prior art constant pivot mechanism requires the use of additional material in the construction of the conveyor, such as the steel cables and lever pivot mechanism, thus adding to the cost of producing the unit. Additionally, with the pulley mechanism and tension maintained upon the cables, additional maintenance and repairs are required of the user, further increasing the overall cost of operation. As a result of these cost considerations, the constant pivot mechanism conveyors fell into disfavor in the industry upon the introduction of the straight cam-lever combination conveyors.

Because of the deficiencies in the prior art conveyors of this type, there exists a need for an improved constant pivot mechanism that will provide a simple and relatively inexpensive way to maintain the same arc of wheel travel as the conveyor frame travels throughout its range of height.

SUMMARY OF THE INVENTION

The present invention overcomes the deficiencies of the prior art pivot mechanisms in radial stacking conveyors by providing a curved channel or cam slot through which the top of the rear push arm travels as the conveyor frame is raised and lowered. The geometry of the curved cam slot more nearly approximates the actual path of travel of the top of the rear push arm which is left to move freely as the conveyor frame is raised and lowered. This allows the cam follower to move with minimal resistance within the cam slot, thus allowing for ease in the positioning of the delivery end of the conveyor belt by either lowering or raising of the conveyor assembly. Utilization of the curved cam slot thus provides an inexpensive and more efficient method of compensating for the movement of the undercarriage in relation to the conveyor frame as it is raised and lowered. The overall savings in the production and maintenance costs of radial stacking conveyors is the salient benefit associated with this invention.

Further features will appear from the following description of the preferred embodiment of the invention which provides an improved curved cam slot arrangement for a constant pivot radial stacking conveyor.

DETAILED DESCRIPTION OF THE PREFERRED EMBODIMENT

Figure 1:
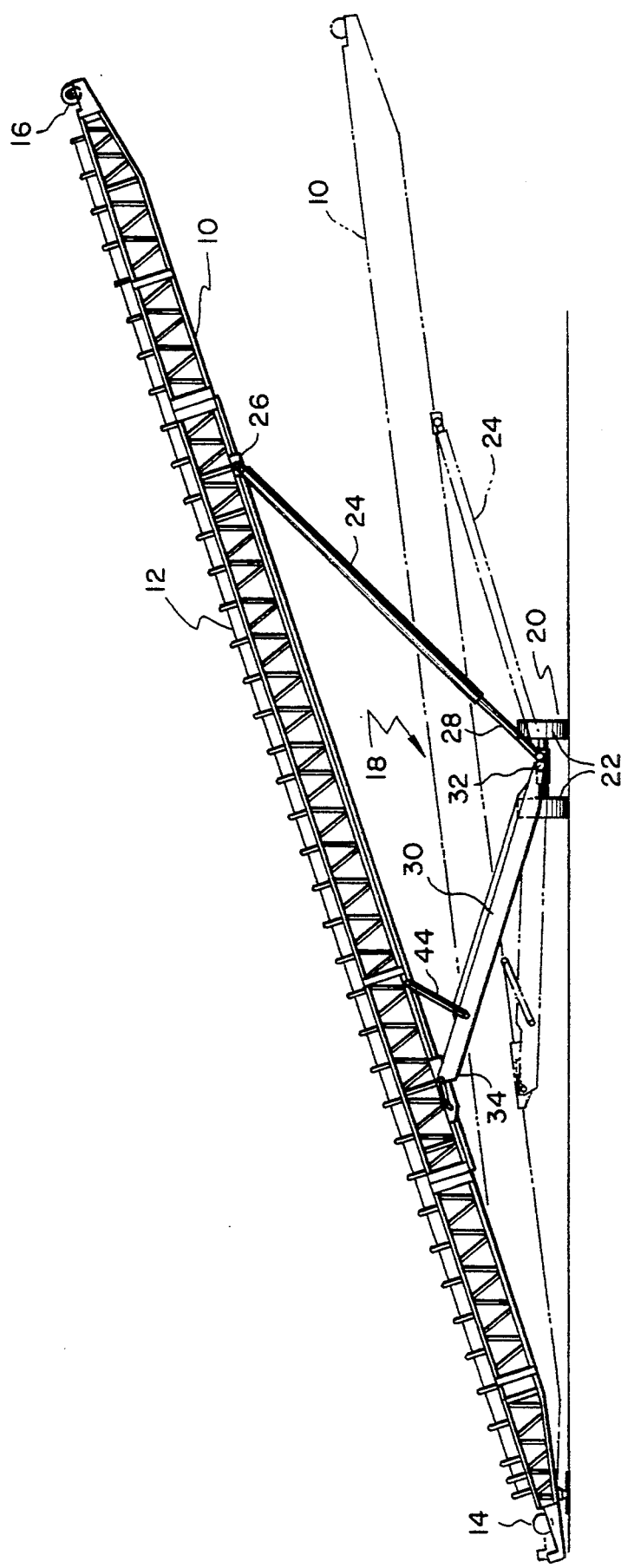
FIG. 1 is a side elevational view illustrating a conveyor of the type to which the invention relates and showing the conveyor frame, undercarriage and wheel assembly.
Figure 2:
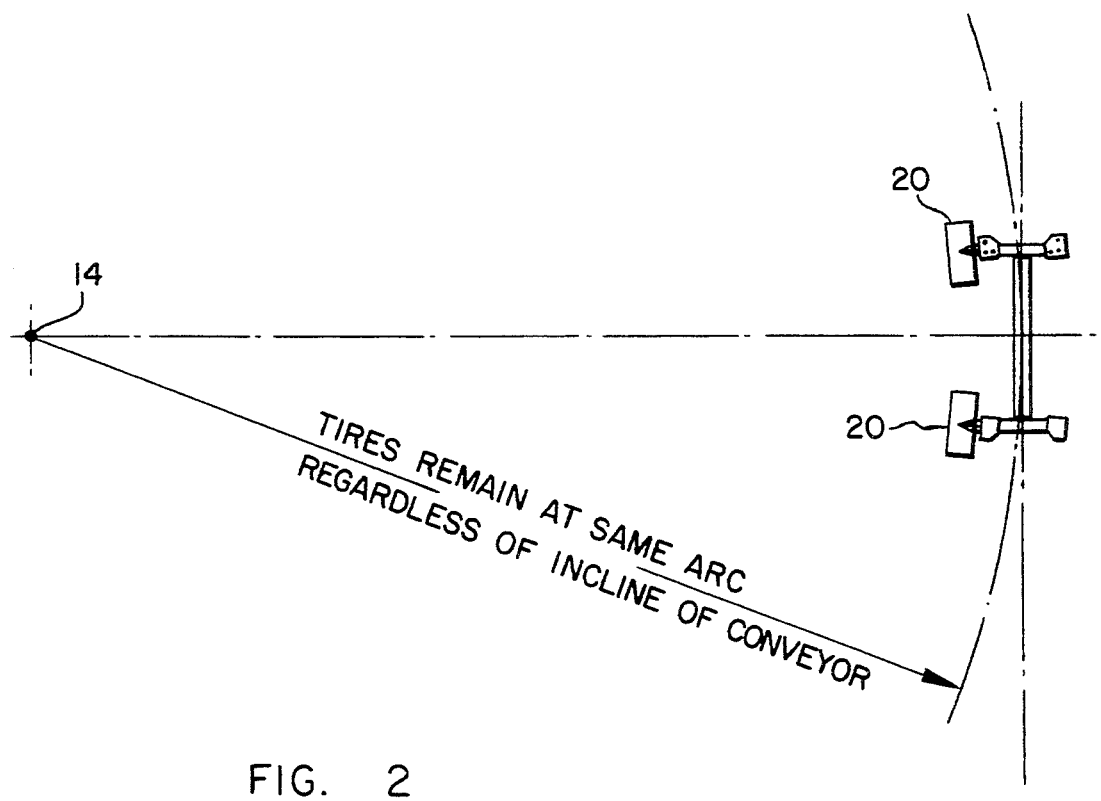
FIG. 2 is schematic view showing the constant radial arc from the pivot point of the conveyor that must be maintained as the conveyor frame is raised and lowered.

In FIGS. 1 and 2 there are illustrated a radial stacking conveyor of a well known type, the conveyor illustrated being a portable or transportable model. However, the principles of the invention are applicable to all radial stacking conveyors regardless of the particular type or design. The conveyor of the preferred embodiment that is illustrated in the drawings includes a conveyor frame 10 of a common truss construction that supports a material carrying endless belt 12 that extends from the foot or tail end 14 of the frame 10 to the head or discharge upper end 16. With this conveyor the belt 12 can transport material from the tail end 14 and discharge the material into stockpiles, storage bins, etc. As is well known, the head end 16 of the conveyor frame 10 must be capable of being elevated and lowered to accommodate different discharge heights.

In the illustrated embodiment, the conveyor frame 10 is supported by a V-style undercarriage, indicated generally by the reference numeral 18, that is connected at its lower end to a running gear 20 that includes a pair of wheels 22. The undercarriage 18 has a front push arm 24 that is pivotly connected at its upper end 26 to the conveyor frame 10 somewhat near the head end 16 and is pivotly connected at its lower end 28 to the running gear 20. The push arm 24 is of a telescopic or other suitable construction that allows the push arm 24 to lengthen or shorten under the power of a hydraulic cylinder (not shown) as is common in the art. When the push arm 24 is lengthened or shortened, the head end 16 of the conveyor frame 10 is raised or lowered. In place of the front push arm 24, other known versions of radial stacking conveyors utilize a cable-mast arrangement for raising and lowering the head end of the conveyor frame. The principles of the invention are applicable to all radial stacking conveyors regardless of the specific way in which the conveyor is elevated and lowered.

The running gear 20 that is illustrated is a tandem walking beam axle which has two pairs wheels 22, but it will be understood that the principles of the invention are applicable to a conveyor that utilizes any type of running gear of which there are many different types depending upon the particular use for the conveyor. Also, as is well known to those skilled in the art, the running gear 20 is power driven so that the conveyor assembly can be swung in an circular path. As is illustrated in FIG. 2, the running gear 20 will follow the same path at a fixed radial distance from the pivot point of the conveyor frame 10 at the tail end 14 regardless of the incline of the conveyor frame 10.

Figure 3:
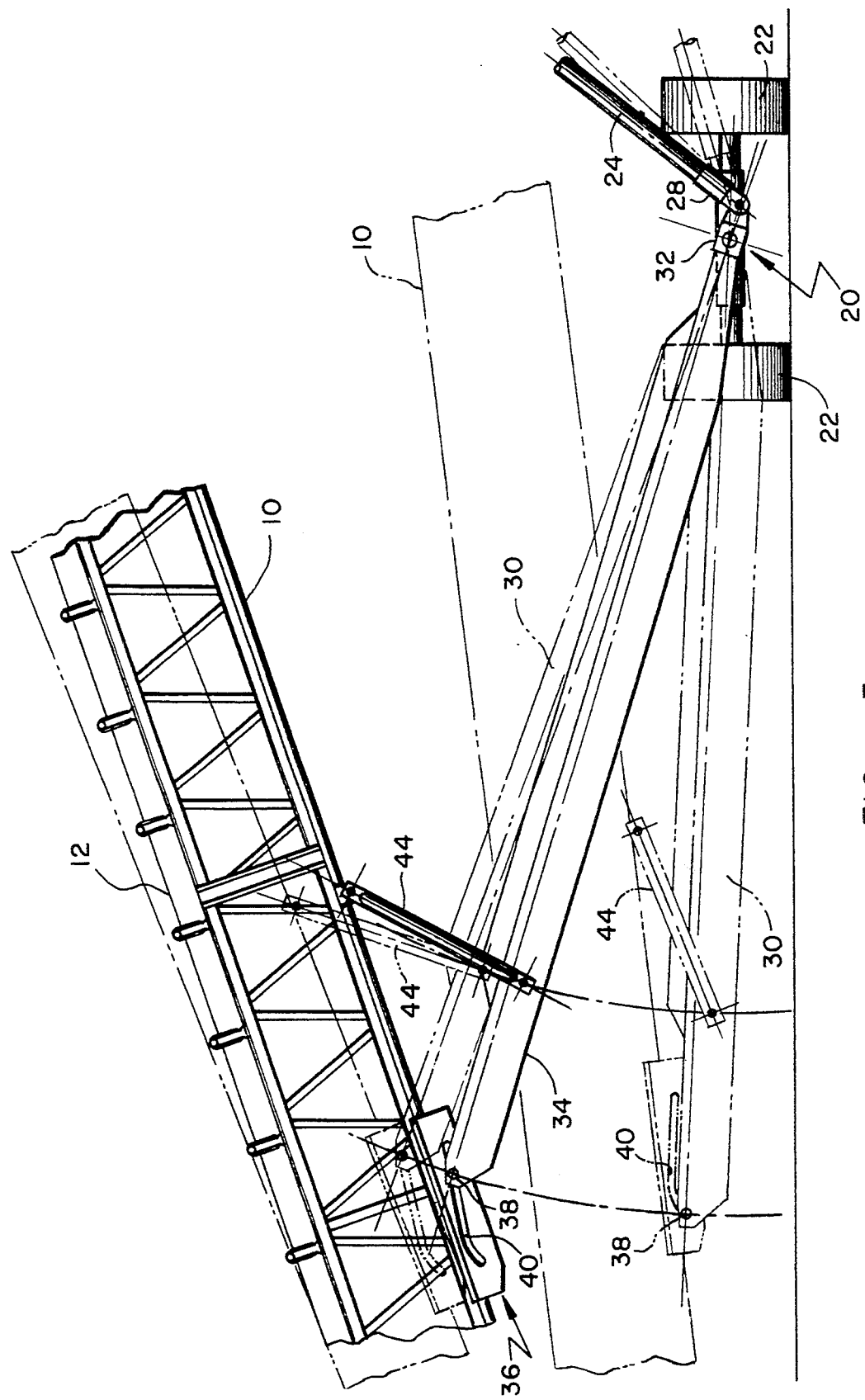
FIG. 3 is an enlarged view of a portion of FIG. 1 and illustrates the rear push arm, the lever arm connection between the rear push arm and conveyor frame, and the cam mechanism located at the intersection of the rear push arm with the conveyor frame, and showing in phantom the lowered position of the conveyor.

The undercarriage 18 also includes a rear push arm 30 that has its lower end 32 pivotly connected to the running gear 20. The upper end 34 of the rear push arm 30 is connected to the conveyor frame 10 by a cam-lever arrangement indicated generally by the reference numeral 36. As best seen in FIG. 3, the upper end 34 of the rear push arm 30 includes a cam follower 38 that is slidably moveable in a curved slot 40 formed in the member 42 fixed to the underside of the conveyor frame 10 somewhat near the tail end 14. A lever arm 44 has its lower end pivotly connected to the rear push arm 30 near its upper end 34. The upper end of the lever arm 44 is pivotly connected to the conveyor frame 10. The lever arm 44 pulls the cam follower 38 through the cam slot 40 as the conveyor frame is raised or lowered thus allowing the running gear 20 to maintain a constant radius as the conveyor assembly revolves about the pivot point of the conveyor at the tail end 14.

Figure 4:
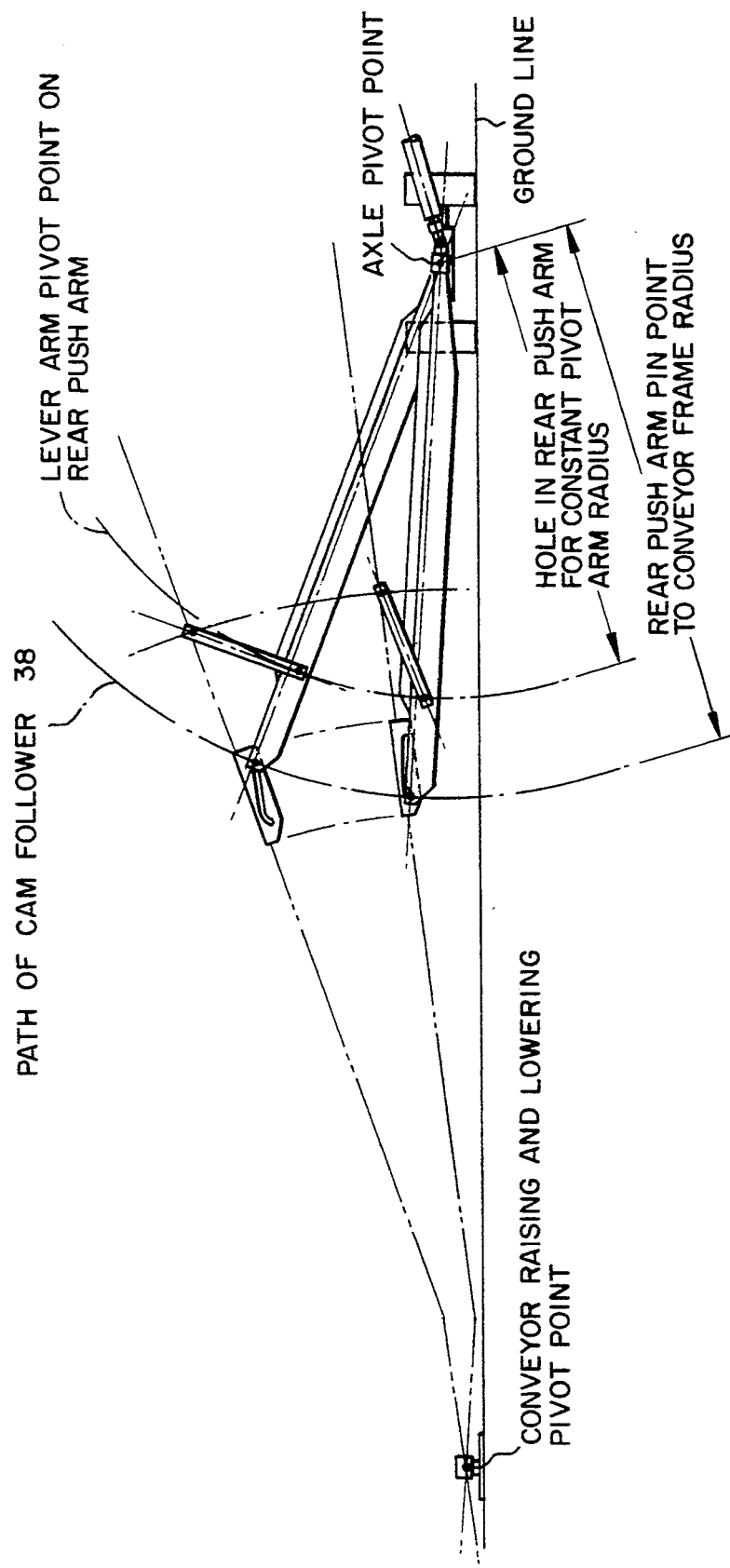
FIG. 4 is a diagram illustrating the paths of the cam follower and the lever arm pivot point as the conveyor is raised or lowered.

The geometry of the curved cam slot 40 approximates the actual path of travel of the top of the rear push arm 30 allowing the cam follower 38 to move freely in the slot 40 as the conveyor frame 10 is raised and lowered. With this arcuate path of the slot 40 the cam follower 38 will move with minimal resistance within the cam slot 40, thus allowing for ease in the positioning of the discharge end 16 of the conveyor assembly or the lowering of the assembly into the transport position. FIG. 4 illustrates the accurate curvature of the cam slot 40. In the lowest position shown in FIG. 4, the conveyor frame 10 is inclined with the cam follower 38 positioned at the rearmost end of the cam slot 40. As the conveyor frame 10 is raised, its angle of incline increases to the maximum, and the cam follower 38 travels the curved cam slot 40 until reaching the front of the cam slot 40 at the point of maximum elevation of the conveyor frame 10. As the cam follower 38 travels through the curved cam slot 40, its travel closely approximates the movements that would occur if the cam follower 38 were allowed to travel in a free and unrestricted fashion as the front push arm 24 is extended to raise the conveyor frame 10 or retracted to lower the frame 10.

The beneficial use of the curved cam mechanism of the invention should be evident from the foregoing detailed description. In summary, however, as the conveyor frame 10 is raised, its angle increases as it pivots on the pivot point at the tail end 14 of the conveyor. In order to maintain the constant distance of the radial traveling arc of the running gear 20 regardless of the incline of the conveyor, the point of connection between the rear push arm 30 and the conveyor frame 10 must move as the angle of the conveyor frame 10 changes. As the geometric relationship changes between the intersections of the triangle configuration formed by the front push arm 24, the rear push arm 30 and the conveyor frame 10 while the angle of the conveyor frame 10 increases and decreases as it is raised and lowered, the actual course of travel of the slidably connected rear push arm 30 with the conveyor frame 10 is approximated by the curved cam slot 40. As a result, the conveyor frame 10 can be maintained in the lowered position and raised throughout its entire range of elevation to the fully raised position without the imposition of structural stresses to the conveyor frame 10 and undercarriage 18 as compared to the prior art versions of radial stacking conveyors.

Having thus described the invention only in connection with a preferred embodiment, it will be understood by those skilled in the art that various revisions and modifications can be made in the specific design of the preferred embodiment illustrated herein without departing from the spirit and scope of the invention. It is my intention, however, that all such revisions and modifications as are obvious to those skilled in the art will be included within the scope of the following claims.

What is claimed is as follows:

1. A variable height radial stacking conveyor for transporting material from a location at a lower level and discharging the material at a higher level, said conveyor comprising a conveyor frame having a tail end and a head end, a material conveying means carried by the conveyor frame for moving material from the tail end and discharging the material at a higher elevation from the head end, an undercarriage combined with the conveyor frame to support the frame, means for raising and lowering the head end of the conveyor frame relative to the tail end, power-driven running gear having ground engaging wheels operatively connected to the undercarriage for moving the head end of the conveyor frame along a arcuate path, the pivot point of the arcuate path being at the tail end of the conveyor with a fixed radius of curvature between the pivot point and the wheels, a rear support arm of a fixed length forming a part of the undercarriage and having a lower end pivotly connected to the running gear and an upper end operatively connected to the conveyor frame near the tail end of the frame, a lever arm having one end pivotly connected to the conveyor frame and the other end pivotly connected to the rear support arm near its upper end, and a cam follower on the upper end of the rear support arm, the conveyor frame having a curved cam slot for receiving the cam follower for limited slidable movement in the cam slot, the curvature of the cam slot substantially following the actual path travelled by the cam follower as the conveyor frame is raised and lowered.

2. The variable height radial stacking conveyor of claim 1 in which the path followed by the point of pivotal connection of the lever arm and the rear support arm as the conveyor frame is raised or lowered is a curved path that has a fixed radius about the pivot point of the connection of the lower end of the rear support arm and the running gear.

3. The variable height radial stacking conveyor of claim 1 in which the means for raising and lowering the head end of the conveyor frame relative to the tail end is a front push arm that is extendable and retractable and which has an upper end connected to the conveyor frame near its head end and a lower end pivotly connected to the running gear.

4. The variable height radial stacking conveyor of claim 2 in which the means for raising and lowering the head end of the conveyor frame relative to the tail end is a front push arm that is extendable and retractable and which has an upper end connected to the conveyor frame near its head end and a lower end pivotly connected to the running gear.

* * * * *